United States Patent [19]

Price, Jr. et al.

[11] Patent Number: 5,193,696
[45] Date of Patent: Mar. 16, 1993

[54] BRAKING MECHANISM FOR A SLIDING TAPE CARTRIDGE STORAGE SYSTEM

[75] Inventors: Macy J. Price, Jr., Louisville; Laurence G. Ball, Denver; Andrew W. Wildhaber, Thornton, all of Colo.

[73] Assignee: Engineered Data Products, Inc., Broomfield, Colo.

[21] Appl. No.: 786,087

[22] Filed: Oct. 31, 1991

Related U.S. Application Data

[63] Continuation-in-part of Ser. No. 679,796, Apr. 3, 1991, abandoned, and a continuation-in-part of Ser. No. 551,131, Jul. 6, 1990, Pat. No. 5,072,838, which is a continuation-in-part of Ser. No. 343,952, Apr. 26, 1989, abandoned.

[51] Int. Cl.$^5$ .............................................. A47F 5/00
[52] U.S. Cl. ....................................... 211/162; 211/41
[58] Field of Search .................. 211/41, 189, 208, 88, 211/103, 190, 192, 162; 312/8, 15, 10, 12, 201; 206/387; 248/221.3

[56] References Cited

U.S. PATENT DOCUMENTS

| | | |
|---|---|---|
| 590,544 | 9/1897 | Hancock . |
| 2,769,196 | 11/1956 | Guilbert, Jr. et al. . |
| 4,600,107 | 7/1986 | Price et al. ............... 211/41 |
| 4,759,676 | 7/1988 | Hammond . |
| 5,062,535 | 11/1991 | Potter ................... 211/162 |
| 5,072,838 | 12/1991 | Price et al. ............ 211/162 |

OTHER PUBLICATIONS

1988 DEMCO product announcement brochure.
1991 Wright Line "Rack'n Roll" brochure dated Jan. 5, 1991.

Primary Examiner—Blair M. Johnson
Attorney, Agent, or Firm—W. Scott Carson

[57] ABSTRACT

A storage rack system for providing high density storage of data cartridges. The storage rack system includes high density center racks having storage capability on opposing sides of the racks. Movable racks having upper rollers recessed below the plane of the upper surface of the movable racks and lower rollers are mounted on the system on both sides of the center racks. The movable racks allow access to at least one column of tape cartridge holders supported on the center racks. Brake members are resiliently mounted on the lower surfaces of the outer movable racks enabling the movable members to come to a complete stop without excessive jarring of the racks or tape cartridge holders.

23 Claims, 6 Drawing Sheets

BRAKING MECHANISM FOR A SLIDING TAPE CARTRIDGE STORAGE SYSTEM

RELATED APPLICATIONS

This application is a continuation-in-part of U.S. patent application No. 07/679,796, filed on Apr. 3, 1991 abandoned, and also a continuation-in-part of U.S. patent application No. 07/551,131, filed on Jul. 6, 1990 U.S. Pat. No. 5,072,838, which is a continuation-in-part of U.S. patent application No. 07/343,952, filed on Apr. 26, 1989, abandoned.

BACKGROUND OF THE INVENTION

1. Field of the Invention

This invention relates to the field of storage rack systems for magnetic data tape cartridges.

2. Statement of the Problem

Large information systems utilizing computers are requiring more and more data cartridge storage cartridges. This correspondingly requires more storage area for these cartridges. Since there is typically only a limited amount of physical space allotted to the storage of the data cartridges, there is increasing pressure to better utilize the space available for the storage of data storage cartridges.

One approach to augmenting the storage capacity for tape cartridge computer systems is to provide racks for retaining tape cartridge storage holders. Tape cartridge holders normally hold a number of tape cartridges for ease of transportation of the cartridges. These tape cartridge holders are then mounted on shelves in a rack until needed.

One such example of this type of system is disclosed in U.S. Pat. No. 4,600,107, issued to Macy Price et al. and assigned to the assignee of the present invention. This system uses a rack having vertically spaced shelves to store holders which can hold up to twenty tape cartridges. However, there is still a need to provide even more storage capacity within the limited area available for storage of the tape cartridges.

Thus, a problem exists in providing storage capacity within a limited area for magnetic data storage cartridges.

3. Solution to the Problem

This problem and others are solved by the storage system of the present invention. The present invention provides a storage rack system for securing a plurality of tape cartridge holders in a high density capacity.

The present invention provides a rack system that increases the capacity of the racks without substantially requiring additional space.

The present invention further provides a rack system that is easily expandable.

The present invention further provides a rack system that can be tailored to the capacity requirements and site conditions.

These and other solutions are provided by the present invention as set forth in the accompanying description and drawings.

SUMMARY OF THE INVENTION

The present invention provides a storage rack system for providing high density storage of data cartridges. The storage rack system includes a high density center rack having storage capability on opposing sides of the rack. The center rack supports tape cartridge holders from the rear of the holders in order to store the holders in close proximity to one another. A plurality of center racks can be affixed to one another to increase the storage capacity.

An upper roller guide is affixed to the upper surface of the center racks on both sides of the racks. A lower extension member is secured to the lower surface of the center racks having an upstanding track extending parallel to the center racks. A brake engaging member is mounted on the lower extension member near the outer ends of the rack system.

Movable racks having upper rollers engaging in the upper roller guides of the center racks and lower rollers engaging on the tracks of the lower extension members are movably mounted on the rack system. The upper rollers are mounted recessed below the plane of the upper surface of the movable racks. This minimizes the height of the system without sacrificing any storage capacity. The movable racks also support tape cartridge holders by the rear of the tape cartridge holders to store the tape cartridge holders in close proximity to one another.

The movable racks are mounted on either or both sides of the center racks so that at least one column of tape cartridge holders supported on the center racks are accessible. The movable racks can then be moved along the upper roller guides and the lower track so any desired column of the center racks can be accessed for cartridge entry and removal.

Brake members are resiliently mounted on the lower surfaces of the outer movable racks. The brake members have tapered brake pads on the lower portion of the brake members which engage in tapered surfaces formed on the brake engaging members mounted on the lower extension members. The tapered surfaces and the resilient mounting of the brake members enable the movable racks to come to a complete stop without excessive jarring of the racks or tape cartridge holders. Resilient bumpers attached on the sides of the movable racks provide damping between the movable racks to reduce collision damage between the racks.

These and other features of the present invention will be evident from the detailed description of a preferred embodiment taken in conjunction with the drawings.

DETAILED DESCRIPTION OF A PREFERRED EMBODIMENT

The present invention provides a storage rack system for providing high density storage of data tape cartridges. This application is a continuation-in-part of U.S. patent application No. 07/679,796, filed on Apr. 3, 1991 and also a continuation-in-part of U.S. patent application No. 07/551,131, filed on Jul. 6, 1990 which is a continuation-in-part of U.S. patent application No. 07/343,952, filed on Apr. 26, 1989, abandoned.

One possible preferred embodiment of the present invention is illustrated in FIGS. 1–6. It is to be expressly understood that this descriptive embodiment is for explanatory purposes only and is not meant to limit the scope of the claimed invention. Other embodiments and modifications are considered to be within the range of the inventive concept.

Figure 1:
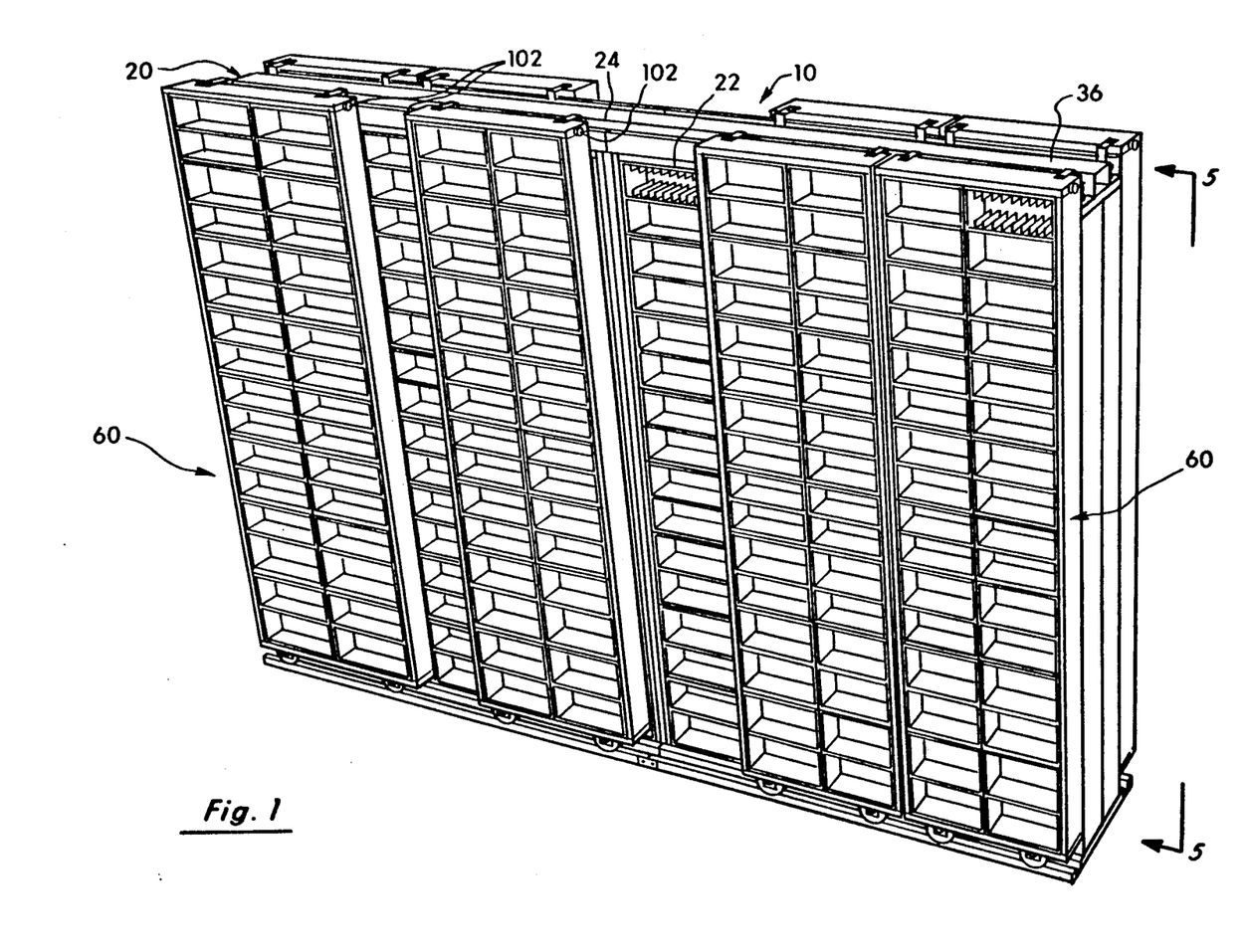
FIG. 1 is a perspective view of a preferred embodiment of the data cartridge storage system of the present invention.
Figure 2:
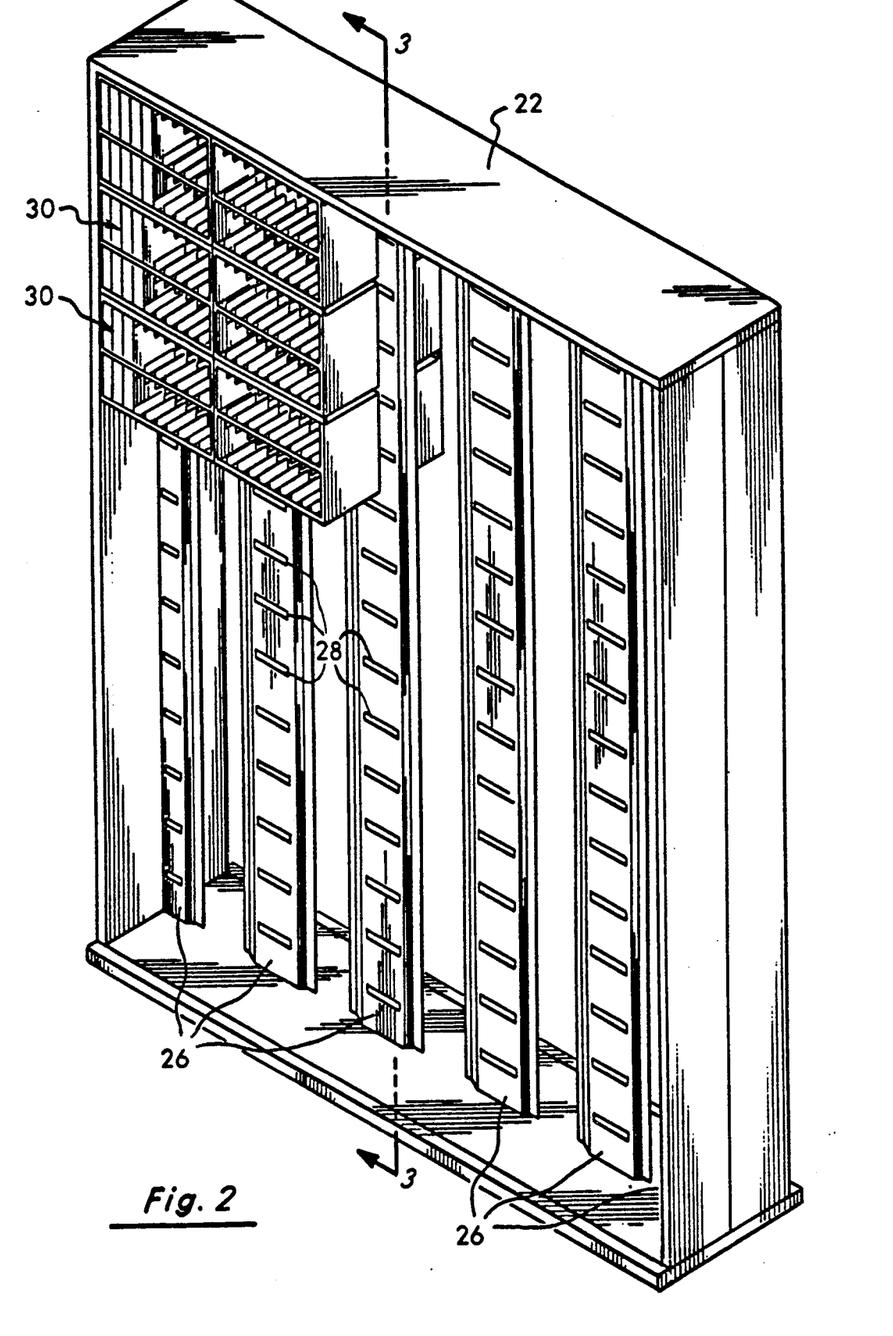
FIG. 2 is a perspective view of a center rack used in the present invention.
Figure 3:
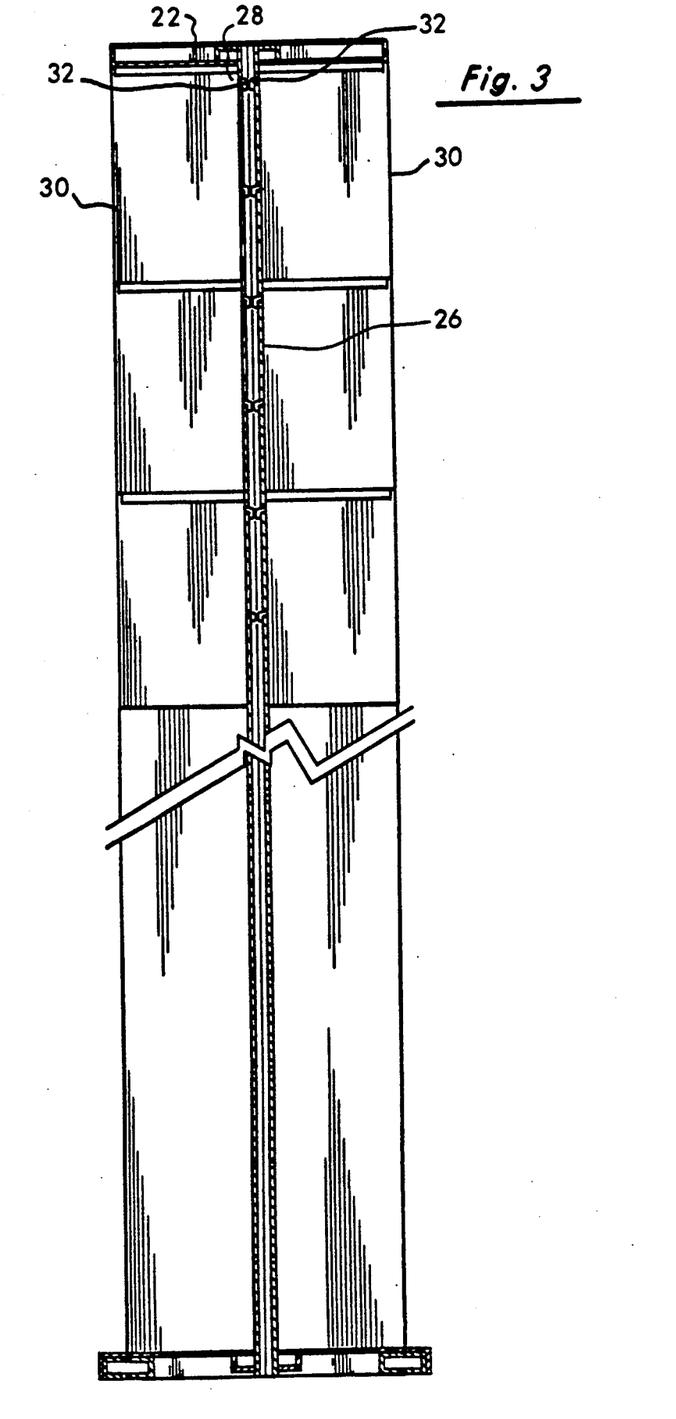
FIG. 3 is a cross-sectional view of FIG. 2 along lines 3—3.

Storage rack system 10, shown in FIG. 1, includes center storage rack 20. Center storage rack 20 includes a pair of racks 22, 24, of a type disclosed in parent application No. 07/679,796. Rack 22, shown in FIG. 2, exemplifies this type of rack. It is to be understood that the present invention is not limited to the details of this rack but includes other racks within the ability of one skilled in the art. Rack 22, shown in FIGS. 2 and 3, has a plurality of vertically extending support members 26 spaced from one another in the center of rack 22. Each of support members 26 includes a plurality of spaced parallel apertures 28 on opposing sides of support members 26. Tape cartridge holders 30 are supported on support members 26 only by suspension hooks 32, shown in FIG. 3, inserted into apertures 28 on support members 26. Thus, a plurality of tape cartridge holders 30 are supported on rack 20 in close proximity to one another. Each tape cartridge holder 30 contains a plurality of tape cartridges therein. In the preferred embodiment, each tape cartridge holder stores twenty (20) tape cartridges and each center rack 22 supports forty (40) tape cartridge holders on each side of center rack 22. Therefore each center rack 22 can store up to sixteen hundred (1600) tape cartridges in the descriptive embodiment. In the embodiment shown in FIG. 1, center rack 20 has a capacity of thirty-two hundred (3200) tape cartridges.

Figure 4:
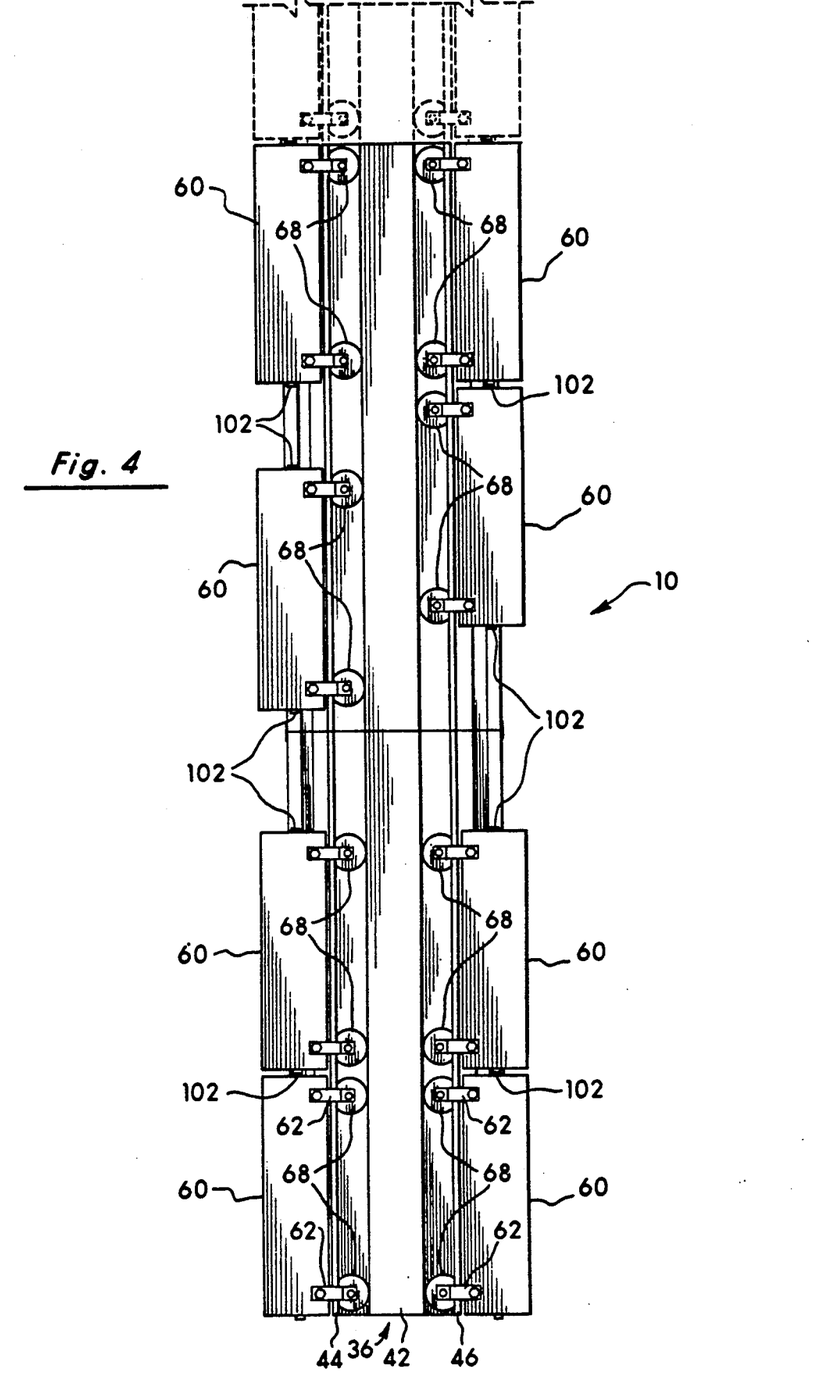
FIG. 4 is a top view of the embodiment of FIG. 1.

Storage rack system 10 of the present invention, as shown in FIG. 4, further includes upper roller guide 36 having upstanding walls 38, 40, shown in FIG. 5, spaced from center support 42 at a predetermined width according to the diameter of upper rollers, described below. Upper roller guide 36 is affixed to the upper surface of center rack 20 by conventional techniques, such as bolting or spot-welding. Each wall 38, 40 includes lip portions 44, 46 respectively, extending over upper roller guide 36. The spacing between center support 42 and walls 38, 40 form upper roller guides as discussed in detail below.

Figure 5:
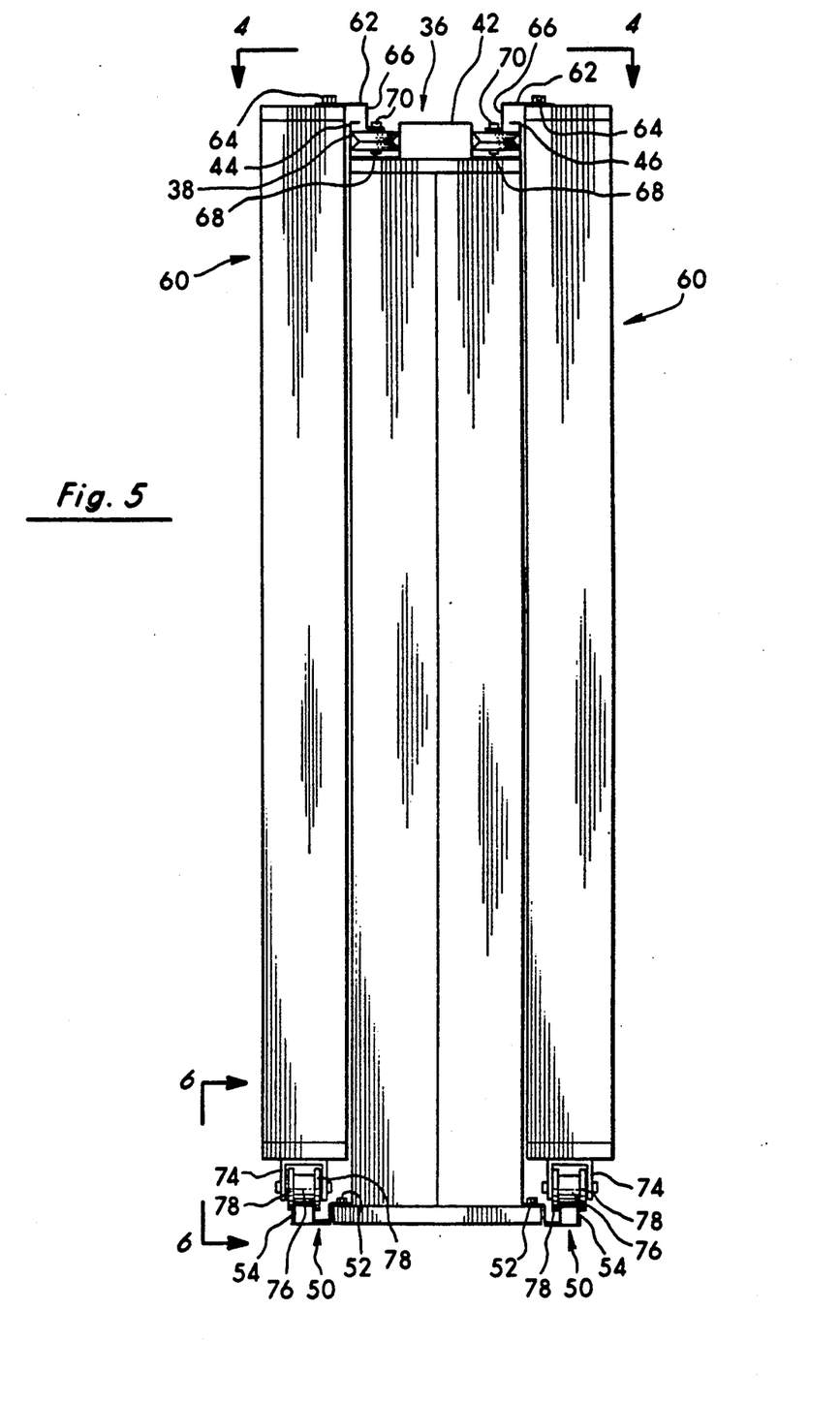
FIG. 5 is an end view of the embodiment of FIG. 1.
Figure 6:
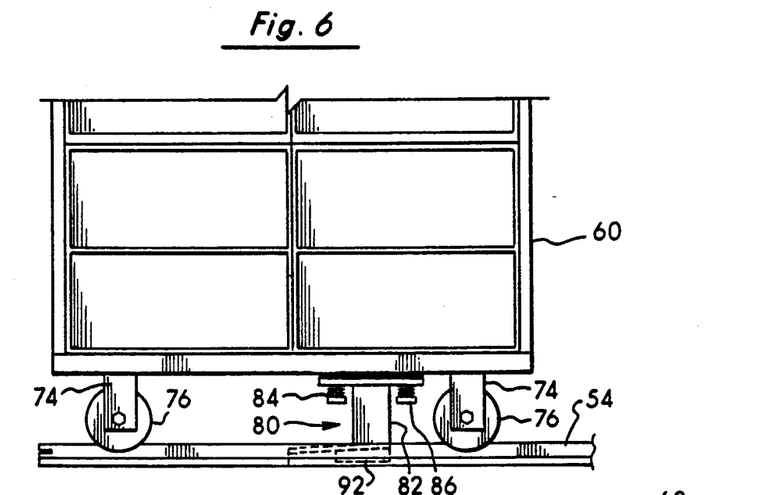
FIG. 6 is a view of the lower end of a movable rack of the embodiment of FIG. 1.

Lower extension member 50, also shown in FIG. 5, is secured to the lower end of center rack 20 by bolts 52. Lower extension member 50 includes upstanding roller guide track 54 spaced from the base of center rack 20. Guide track 54 is approximately the width of lower rollers described below.

Movable racks 60 are mounted in storage rack system 10 for movement relative to center rack 20. In the embodiment shown in FIG. 1, there are four movable racks 60 mounted for movement relative to center rack 20 on each side of center rack 20. Movable racks 60 are designed similar to center rack 20. Vertically extending support members, similar to members 26, are affixed near the rear of movable racks 60. Apertures are formed in the support members for tape cartridge holders to be affixed therein. Each movable rack 60 includes a width sufficient to mount two tape cartridge holders side by side and a height sufficient to mount eight tape cartridges high. This adds an additional capacity of two thousand five hundred sixty (2560) tape cartridges to the systems shown in FIG. 1 for a total capacity of five thousand seven hundred sixty (5760) tape cartridges.

This configuration allows access to one column of tape cartridge holders in center rack 20. Movable racks 60 are movable, as discussed below, to allow any one the columns of tape cartridge holders in center rack 20 to be accessible. Other configurations of center rack 20 and movable racks 60 are considered to be within the scope of the invention. For instance, an additional single width movable rack could be added to afford additional storage while still allowing the center rack to be accessed. Also, a single center rack 20 and two movable racks 60, one being wide enough for two tape cartridge holders and the other being wide enough for only one tape cartridge holder.

Each movable rack 60, shown in FIGS. 4 and 5, includes bracket 62 secured to the upper surface of movable rack 60 by bolt 64. Bracket 62 includes a downwardly extending portion 66 onto which roller 68 is secured by bolt 70. Rollers 68 are secured into upper roller guide 36 by lip portions 44, 46. Movable racks 60 are inserted into storage rack system 10 from the ends to allow rollers 68 into upper roller guides 36. Thus, rollers 68 are recessed below the plane of the upper surface of movable racks 60 to minimize the height of storage rack system 10.

U-shaped brackets 74 are affixed to the lower surface of each of movable racks 60 near the ends of each of movable racks 60 and in the center of movable racks 60. Rollers 76 are rotatably mounted in each bracket 74. Each roller 76 includes outer flanges 78 thereon. Rollers 76 engage upstanding roller guide track 54 as upper rollers 68 are engaged in guide 36 to support movable racks 60 for movement relative to center rack 20. Flanges 78 prevent rollers 76 from becoming misaligned on upstanding roller guide track 54.

Upper rollers 68 are recessed below the upper surface of movable racks 60 a distance equal to the distance movable racks 60 are raised due to lower rollers 76 and upstanding track 54. This allows each of movable racks 60 to contain the same number of tape cartridge holders as center rack 20 without substantially increasing the size of the system.

Movable racks 60 are mounted on opposing sides of center rack 20, as shown in FIGS. 1 and 5. Also, as shown in FIGS. 1 and 5, additional center racks 20 and movable racks 60 can be added onto storage rack system 10 simply by attaching the center racks end to end and providing additional upper roller guides and lower roller guides. The systems are designed to be aligned so that the movable racks can roll from center rack to center rack as desired.

Brakes are provided on the storage rack system to prevent damage from the movable rack systems striking the ends or sliding off the roller guides. Brake 80, shown in FIGS. 6–8, includes downwardly extending portion 82 secured to the lower surface of movable rack 60. Spring biased shoulder screws 84, 86, 88, 90 (all of which are not shown) resiliently secure brake 80 to movable rack 50. Springs 85, 87, 89, 91 (all of which are not shown) are mounted between brake member 82 and shoulder screws 84, 86, 88, 90. Springs 85, 87, 89, 91 provide upward resilient biasing of brake member 82 as shown by arrow 101 in FIG. 7. Lower end surface 92 on portion 82 includes brake pad 94 affixed thereto. Brake pad 94 is formed from a material, such as a fibrous braking material, that will frictionally engage a braking surface without metal to metal contact. Brake pad 94 tapers downwardly and outwardly from portion 82.

Figure 7:
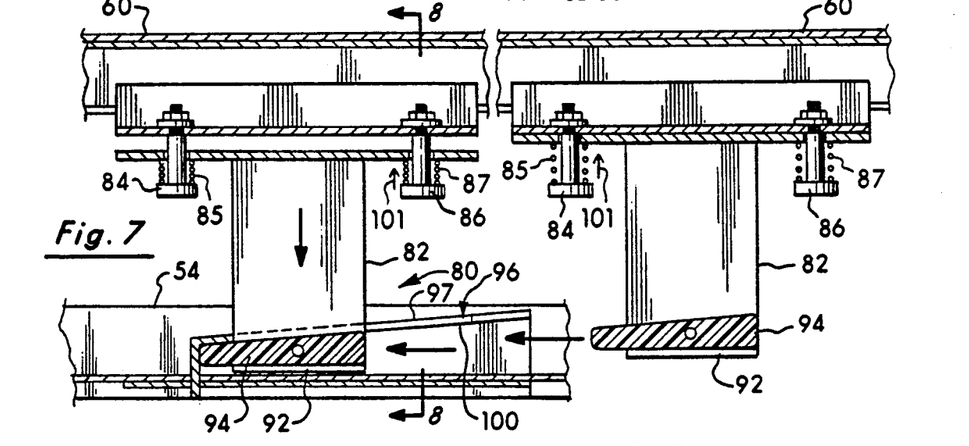
FIG. 7 is cross-sectional view of the movement of the brake mechanism.
Figure 8:
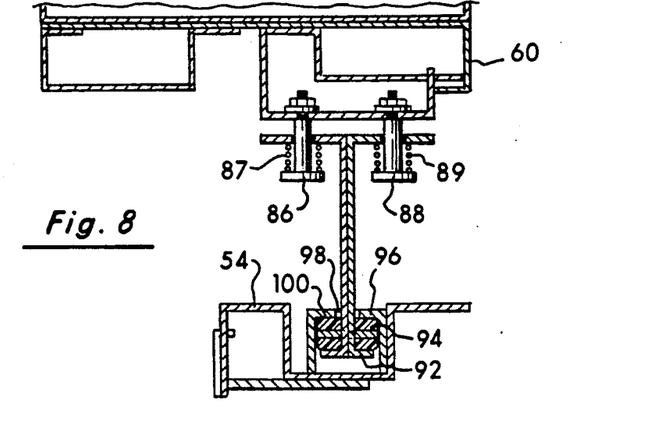
FIG. 8 is a cross-sectional end view of FIG. 7 along line 6—6.

Brake engaging member 96 is affixed on lower extension member 50 adjacent upstanding track portion 54 near the ends of storage rack system 10. Elongated flange 97 on brake engaging member 96 extends angularly downward, as shown in FIG. 7. The lower surface of elongated flange 97 forms engaging surface 100. Brake engaging member 96 includes groove 98 formed therein on upper engaging surface 100. Groove 98 is slightly wider than brake portion 82 and aligned therewith.

In operation, as brake portion 82 enters into groove 98, brake pad 94 frictionally engages against engaging surface 100 to slow the travel of movable rack 60. The further brake portion 82 enters into brake engaging member 96, the more brake pad surface contacts engaging surface 100. The tapered surfaces of brake pad 94 and engaging surface 100 also increase frictional pressure to stop the movable rack. Also, the tapered surfaces of brake pad 94 and engaging surface 100 pull shoulder bolts 82-88 downward against the spring mounting. This provides an additional braking force from the compressed springs. This resilient biasing of brake 80 relative to movable rack 60 prevents sudden stopping of the movable rack which might lead to damage.

Resilient bumpers 102, such as rubber stops, are mounted near the top of the side walls of movable racks 60. Bumpers 102 provide damping between the movable racks to reduce damage due to collision of the movable racks with one another.

Storage rack system 10 is easily adaptable to be configured to fit the needs and site conditions of the user. Additional center racks 20 can be affixed end to end along with corresponding lower extension members 50 and upper roller guides 36. Also, lower extension members 50 and upper roller guides 36 can be mounted on both sides of the center racks. Movable racks 60 are then inserted into upper roller guides 36 and onto lower track 54. Since movable racks 60 can be moved along these guides regardless the number of center racks used, the size and number of movable racks can be chosen for convenience, as long as at least one column of tape cartridge holders supported on the center racks is exposed.

Brake engaging members 96 are mounted near the end of travel of the movable racks on the outermost lower extension members. The outer movable racks include brake members 80 affixed so that lower brake surfaces 92 extend towards the outer ends of the rack system. This prevents damage due to the movable racks sliding off the rack system 10 as well as providing damping to the racks. Bumpers 102 provide damping for the inner movable racks to reduce collision damage of the movable racks against one another.

Tape cartridge holders 30 are filled with tape cartridges to be inserted and removed on center racks 22, 24 through the spaces between movable rack. When it is necessary to access another column on the center racks, the movable racks 50 are moved along the guides to allow exposure of another column. Movable racks 50 can be configured in a single column width, double column width or triple column width according to the needs of the user. The ability to expand through addition of more center racks and to mount movable racks on both sides of the center racks provides improved storage capacity without significantly increasing the physical space necessary as did previous rack systems. The use of the recessed upper rollers provides increased capacity with only nominal increase in the size of the systems. Also, the use of the novel braking system reduces the possibility of damage to either the system or the tape cartridges.

Thus, the present invention provides a high density storage system for storing data cartridges. This system increases the storage capacity of an area without increasing the need for additional physical space. It is to be expressly understood that this description of one possible preferred embodiment is not meant to limit the scope of the claimed inventive concept. Other variations and embodiments are considered to be within the claimed inventive concept.

We claim:

1. A storage rack system for storing tape cartridges, said storage rack system comprising:
   at least one stationary rack;
   a brake engaging member mounted on said at least one stationary rack;
   an elongated flange on said brake engaging member extending angularly downward from a first end of said brake engaging member;
   a first engaging surface on a lower surface of said flange;
   at least one movable rack;
   means for supporting said at least one movable rack for movement along a path relative to said at least one stationary rack;
   a brake member;
   means for mounting said brake member to said at least one movable rack, said brake member being movable relative to said at least one movable rack along an axis substantially perpendicular to said path of movement of said movable rack;
   a lower portion of said brake member having a second engaging surface on the upper surface thereof for frictionally engaging said first engaging surface to brake the movement of said at least one movable rack along said path of movement; and
   at least one spring element for biasing said brake member upward along said axis to progressively increase the frictional resistance between said first engaging surface and said second engaging surface as said at least one movable rack moves along said path of movement to gradually brake the movement of said at least one movable rack along said path of movement.

2. The storage rack system of claim 1 wherein said at least one spring element includes:
   a first spring element for biasing a front portion of said brake member upward; and
   a second spring element for biasing said rear portion of said brake member upward and further allowing said brake member to pivot relative to said movable rack as second engaging surface engages said first engaging surface.

3. The storage rack system of claim 1 wherein said means for mounting said brake member includes:
   means for mounting a front portion of said brake member to said at least one movable rack to be movable along a first axis substantially perpendicular to said path of movement; and
   means for mounting a rear portion of said brake member to said at least one movable rack to be movable along a second axis substantially perpendicular to said path of movement and further allowing said brake member to pivot relative to said movable rack as said second engaging surface engages said first engaging surface.

4. The storage rack system of claim 3 wherein said at least one spring element includes:
a first spring element for biasing said front portion of said brake member upward along said first axis; and
a second spring element for biasing said rear portion of said brake member upward along said second axis, said brake member being allowed to pivot relative to said path of movement as second engaging surface engages said first engaging surface.

5. The storage rack system of claim 1 wherein said second engaging surface includes:
a brake pad for frictionally engaging said first engaging surface.

6. The storage rack system of claim 1 wherein said at least one spring element includes:
a compression spring.

7. The storage rack system of claim 1 wherein means for mounting said brake member includes:
means for adjusting the bias of said at least one spring element.

8. The storage rack system of claim 1 wherein said supporting means includes:
upper rollers on said at least one movable rack engaging roller tracks secured to an upper portion of said at least one stationary rack; and
lower rollers on said at least one movable rack engaging roller tracks secured to a lower portion of said at least one stationary rack.

9. A storage rack system for storing tape cartridges, said storage rack system comprising:
at least one stationary rack;
a brake engaging member mounted on said at least one stationary rack;
an elongated flange on said brake engaging member extending angularly downward from a first end of said brake engaging member;
a first engaging surface on the lower surface of said flange;
at least one movable rack;
means for supporting said at least one movable rack for movement along a path relative to said at least one stationary rack;
a brake member;
means for mounting said brake member to said at least one movable rack, said brake member being pivotal relative to said at least one movable rack;
a lower portion of said brake member having a second engaging surface on the upper surface thereof for frictionally engaging said first engaging surface to brake the movement of said at least one movable rack; and
at least one spring element biasing said second engaging surface against said first engaging surface to progressively increase the frictional resistance between said first engaging surface and said second engaging surface as said at least one movable rack moves along said path of movement to gradually brake the movement of said at least one movable rack along said path of movement.

10. The storage rack system of claim 9 wherein said at least one spring element includes:
a first spring element for biasing said front portion of said brake member; and
a second spring element for biasing said rear portion of said brake member to allow said brake member to pivot as second engaging surface engages said first engaging surface.

11. The storage rack system of claim 9 wherein said means for mounting said brake member includes:
means for mounting a front portion of said brake member to said at least one movable rack to be movable along a first axis substantially perpendicular to said path of movement of said movable rack; and
means for mounting a rear portion of said brake member to said at least one movable rack to be movable along a second axis substantially perpendicular to said path of movement of said movable rack so said brake member pivots as said second engaging surface engages said first engaging surface.

12. The storage rack system of claim 11 wherein said at least one spring element includes:
a first spring element for biasing said front portion of said brake member upward along said first axis; and
a second spring element for biasing said rear portion of said brake member upward along said second axis and further allowing said brake member to pivot as second engaging surface engages said first engaging surface.

13. The storage rack system of claim 9 wherein said second engaging surface includes:
a brake pad for frictionally engaging said first engaging surface.

14. The storage rack system of claim 9 wherein said at least one spring element includes:
a compression spring.

15. The storage rack system of claim 9 wherein means for mounting said brake member includes:
means for adjusting the bias of said at least one spring element.

16. The storage rack system of claim 9 wherein said supporting means includes:
upper rollers on said at least one movable rack engaging roller tracks secured to an upper portion of said at least one stationary rack; and
lower rollers on said at least one movable rack engaging roller tracks secured to a lower portion of said at least one stationary rack.

17. A storage rack system for storing tape cartridges, said storage rack system comprising:
at least one stationary rack;
a brake engaging member mounted on said at least one stationary rack;
an elongated flange on said brake engaging member extending angularly downward from a first end of said brake engaging member;
a first engaging surface on the lower surface of said flange;
at least one movable rack;
means for supporting said at least one movable rack for movement along a path relative to said at least one stationary rack;
a brake member;
means for mounting a front portion of said brake member to said at least one movable rack, said brake member being movable relative to said at least one movable rack along a first axis substantially perpendicular to said path of movement;
a first at least one spring element biasing said front portion of said brake member upward along said first axis;

means for mounting a rear portion of said brake member to said at least one movable rack, said brake member being movable relative to said at least one movable rack along a second axis substantially perpendicular to said path of movement;

a second at least one spring element biasing said rear portion of said brake member upward along said second axis;

a lower portion of said brake member having a second engaging surface on the upper surface thereof for frictionally engaging said first engaging surface to brake the movement of said at least one movable rack; and said first at least one spring element and said second at least one spring element progressively increase the frictional resistance between said first engaging surface and said second engaging surface as said at least one movable rack moves along said path of movement to gradually brake the movement of said at least one movable rack.

18. The storage rack system of claim 17 wherein said second engaging surface includes:

a brake pad for frictionally engaging said first engaging surface.

19. The storage rack system of claim 17 wherein each of said first at least one spring element and said second at least one spring element includes:

a compression spring.

20. The storage rack system of claim 17 wherein means for mounting said brake member includes:

means for adjusting the bias of said at least one spring element.

21. The storage rack system of claim 17 wherein said supporting means include:

upper rollers on said at least one movable rack engaging roller tracks secured to an upper portion of said at least one stationary rack; and lower rollers on said at least one movable rack engaging roller tracks secured to a lower portion of said at least one stationary rack.

22. The storage rack system of claim 1 wherein said at least one spring element includes:

a first spring element for biasing a front portion of said brake member upward; and a second spring element for biasing said rear portion of said brake member upward.

23. The storage rack system of claim 1 wherein said means for mounting said brake member includes:

means for mounting a front portion of said brake member to said at least one movable rack to be movable along a first axis substantially perpendicular to said path of movement; and means for mounting a rear portion of said brake member to said at least one movable rack to be movable along a second axis substantially perpendicular to said path of movement.

* * * * *